United States Patent [19]

Petty

[11] 4,031,775

[45] June 28, 1977

[54] HAND GRIP

[76] Inventor: Preston L. Petty, 403 N. Main, Newberg, Oreg. 97132

[22] Filed: Feb. 9, 1976

[21] Appl. No.: 656,729

[52] U.S. Cl. .......................... 74/551.9; 16/110 R; 280/11.37 H

[51] Int. Cl.² ...................................... B62K 21/26

[58] Field of Search ............... 16/DIG. 12, 110 R; 74/551.9, 558.5; D8/138; 280/11.37 H; 273/81 R, 81 B

[56] References Cited

UNITED STATES PATENTS

| | | | |
|---|---|---|---|
| 2,208,365 | 7/1940 | Gerber | 280/11.37 H |
| 2,666,340 | 1/1954 | Hunt | 74/551.9 |
| 3,016,763 | 1/1962 | Albert | 74/551.9 |
| 3,179,435 | 4/1965 | Miller | 74/551.9 X |
| 3,436,090 | 4/1969 | Lange et al. | 280/11.37 H |
| 3,451,688 | 6/1969 | McDonald | 280/11.37 H |

FOREIGN PATENTS OR APPLICATIONS 461,878 2/1951 Italy .................. 74/551.9

*Primary Examiner*—Andrew V. Kundrat
*Attorney, Agent, or Firm*—Adrian J. LaRue

[57] ABSTRACT

A hand grip for use on handle bars of a motor vehicle which has a hand-gripping section having finger-gripping means defining intersecting planar surfaces and palm-gripping means defining a semi-circular area having spaced ribs therealong, a torus-shaped thumb guard at one end and a bulbous section at the other end.

5 Claims, 4 Drawing Figures

HAND GRIP

BACKGROUND OF THE INVENTION

Hand grips have been used for many years on motorcycle handle bars or the like. The hand-gripping section of these conventional hand grips has an annular or round configuration. Different rib patterns are provided along the hand-gripping section in order to prevent slippage and to provide for frictional engagement to rotate the hand grip that is mounted on the throttle-operating member.

Even though these rib patterns provide frictional engagement to rotate the hand grip thereby operating the throttle, when conditions are wet or muddy, these hand grips become slippery and the only way to maintain control is to squeeze harder which tires hands and forearms.

SUMMARY OF THE INVENTION

The present invention relates to hand grips and more particularly to hand grips for use on motorcycle handle bars.

An object of the present invention is to provide handlebar hand grips that are provided with a hand-gripping section that conforms to the shape of an operator's hands to enable the operator to operate the throttle with less friction between the operator's hand and the hand grip thereby assuring more positive control.

Another object of the present invention is the provision of a handlebar hand grip having a finger-gripping section of planar surfaces joined at inner ends thereof which conforms to the first and second finger joints of an operator's hand.

A further object of the present invention is to provide a handlebar hand grip that has a palm-gripping section of semi-circular configuration having spaced ribs therealong.

A still further object of the present invention is to provide a handlebar hand grip that has a torus-shaped thumb guard at one end.

An additional object of the present invention is the provision of a handlebar hand grip that has a bulbous end of similar configuration as the hand-gripping section.

A still further object of the present invention is to provide a handlebar hand grip that is made from an extra pliable rubber material that is sticky even when wet which reduces abrasion and effort in operation.

These and other objects of the invention will appear more fully from the following description and the accompanying drawing illustrating a preferred embodiment of the invention. It is to be understood that changes may be made from the exact details shown and described without departing from the principles of the invention.

DETAILED DESCRIPTION OF THE INVENTION

Figure 1:
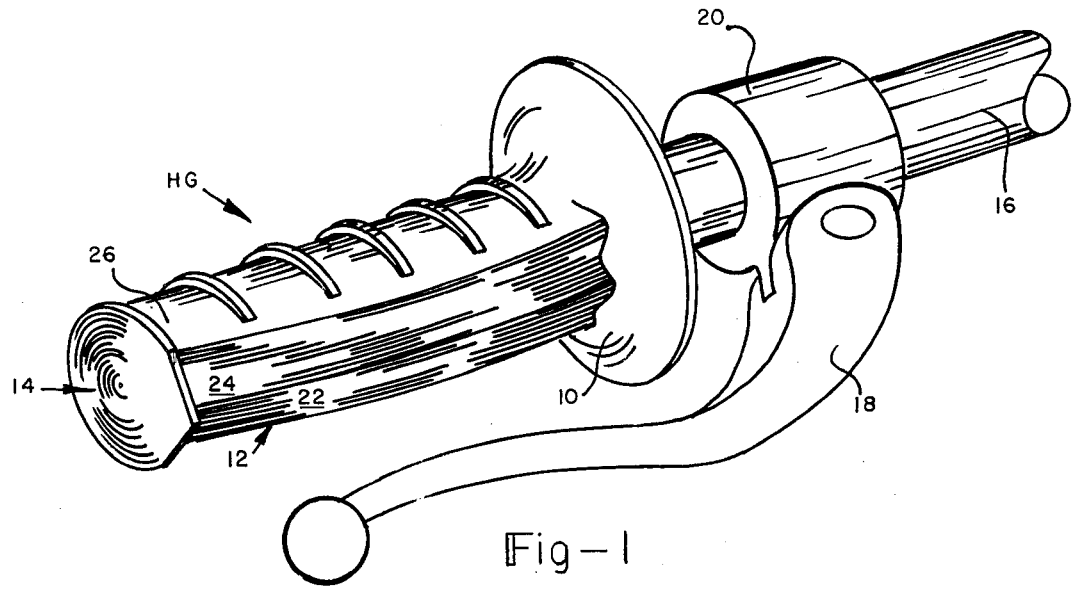
FIG. 1 is a perspective view of the throttle side of a handlebar having a hand grip thereon.
Figure 2:
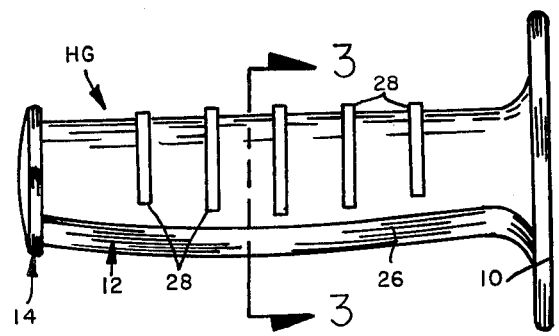
FIG. 2 is a side elevational view of the hand grip.

Turning now to the drawing, a hand grip HG is illustrated in FIGS. 1–4 which includes a torus section 10, a hand-gripping section 12 and a bulbous end section 14. The hand grip HG has a hole 12a of proper diameter to enable it to be telescopically disposed on cylindrical throttle-operating member (not shown) on handlebar 16, only the right handlebar being shown. A front brake lever 18 is pivotally mounted via bracket 20 to handlebar 16 and it extends along hand grip HG for engagement by the fingers of an operator's hand.

Hand grip HG is preferably molded from a commercially-available thermo-plastic rubber material that is extra pliable and it is sticky even when wet to preclude slipping.

Figure 4:
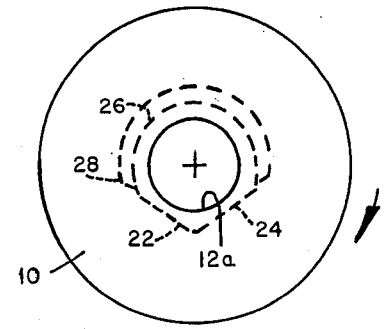
FIG. 4 is a front elevational view of the front end of the hand grip.
Figure 3:
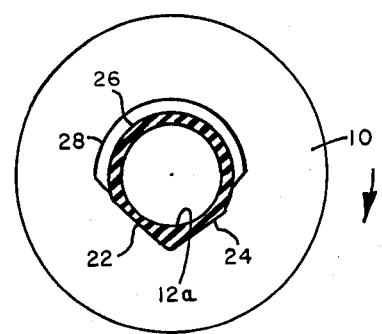
FIG. 3 is a cross-sectional view taken along lines 3—3 of FIG. 2.

Torus section 10 and bulbous end section 14 keep an operator'hand in engagement with hand-gripping section 12 and torus section 10 prevents throttle abrasion. Hand-gripping section 12 has a finger-gripping area comprising planar surfaces 22 and 24 and a palm-gripping area comprising a semi-circular surface 26. Surfaces 22 and 24 are connected along their inner ends and define a V-shape in cross-section as shown in FIGS. 3 and 4. These planar surfaces 22 and 24 are engaged by the first and second joints of the hand. Moreover, planar surfaces 22 and 24 are slightly inclined from their ends adjacent torus section 10 and bulbous end section 14 to the center of the hand grip to accommodate to the cup-shaped configuration of the hand.

Semi-circular surface 26 of the palm-gripping area has the same radius therealong and it has ribs 28 at equally spaced intervals therealong which extend outwardly therefrom. Each of ribs 28 extend from the outer edges of planar surfaces 22 and 24 all the way along semi-circular surface 26 in a transverse direction with respect to the longitudinal orientation of the hand grip and the ribs from the center rib to the outer-most ribs on each side thereof have a decreasing height. The reason for this is to accommodate the cup-shaped configuration of the operator's hand. The ribs prevent the hand from slipping along the hand-gripping section and bulbous end section 14 and torous section to keep the hand oriented onto the hand gripping section. Bulbous end section 14 has the same configuration as the hand-gripping section but of course it is larger. It has been found that this hand grip of V-shaped finger-gripping section and ribbed semi-circular palm-gripping section requires much less physical effort to operate the throttle and to maintain it in a desired location so that the hand and forearm do not become overly tired. Since less frictional engagement is required between an operator's hand and the hand-gripping section to operate the throttle, this greatly lessens the chance of blisters occurring.

As can be discerned the hand-gripping section 12 comprises flat surfaces that are substantially parallel to the longitudinal axis of the hand grip and these flat surfaces are joined to adjacent flat surfaces along their edges which form a rib that is likewise substantially parallel to the longitudinal axis and a semi-circular surface having ribs equally spaced therealong of varying heights.

As regards the left handlebar, hand grip HG is mounted thereon, and it is the same as hand grip HG of FIG. 1–4 except it has a smaller diameter hole to enable it to be telescopically mounted directly on the left handle bar since it is stationarily mounted thereon. A clutch-operating lever (not shown) similar to brake lever 18 is pivotally mounted on the left handle bar and is operated by the fingers of the left hand.

It can readily be discerned that there has been illustrated and described a hand grip that provides excellent operating characteristics, minimizes hand and arm fatigue and substantially reduces frictional engagement during operation. Although the invention has been explained with reference to a particular embodiment, it is to be appreciated that various adaptations and modifications may be made without departing from the appended claims.

The invention is claimed in accordance with the following:

1. A hand grip for a handlebar comprising:
   a hand-gripping section;
   means at each end of said hand-gripping section to maintain an operator's hand in position on said hand-gripping section;
   said hand-gripping section having a finger-engaging area and a palm-engaging area, said finger-engaging area defining a plurality of flat surfaces therealong which are disposed substantially parallel with respect to a longitudinal axis of said hand grip and said flat surfaces are joined thereby defining a slightly curved linear ridge the length of said hand gripping section so that said plurality of flat surfaces and ridge define in cross-section at least a V-shape configuration conforming to the jointed formation of finger joints of an operator's hand when engaging said hand-gripping section, said palm-engaging area defining a semi-circular surface having rib means disposed therealong at spaced intervals conforming to the palm area of the operator's hand when engaging said palm-engaging area and being truncated at their ends short of said flat surfaces 2. A hand grip according to claim 1 wherein said flat surfaces are slightly inclined from each of said end means to a central area of said hand-gripping section.

3. A hand grip according to claim 1 wherein one of said end means comprises a torus section.

4. A hand grip according to claim 1 wherein another of said end means comprises a bulbous end section larger than said hand-gripping section and having the same configuration thereof.

5. A hand grip according to claim 1 wherein said rib means from a center rib means to the outermost rib means on each side of said center rib means decreases in height.

* * * * *